United States Patent
Pal (10) Patent No.: US 10,767,566 B2
(45) Date of Patent: Sep. 8, 2020

(54) ELECTRIC PROPULSION MOTOR COOLING SYSTEM AND METHOD

(71) Applicant: Hamilton Sundstrand Corporation, Charlotte, NC (US)

(72) Inventor: Debabrata Pal, Hoffman Estates, IL (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 204 days.

(21) Appl. No.: 15/927,857

(22) Filed: Mar. 21, 2018

(65) Prior Publication Data

US 2019/0292993 A1  Sep. 26, 2019

(51) Int. Cl.
| | |
|---|---|
| *F02C 7/32* | (2006.01) |
| *H02P 29/40* | (2016.01) |
| *B64D 27/16* | (2006.01) |
| *B64D 27/24* | (2006.01) |
| *F02K 3/06* | (2006.01) |
| *H02K 5/20* | (2006.01) |
| *H02K 7/14* | (2006.01) |
| *H02K 9/06* | (2006.01) |
| *F02C 7/36* | (2006.01) |
| *F01D 25/12* | (2006.01) |
| *F01D 25/36* | (2006.01) |
| *B64D 27/02* | (2006.01) |

(52) U.S. Cl.
CPC ............... *F02C 7/32* (2013.01); *B64D 27/16* (2013.01); *B64D 27/24* (2013.01); *F01D 25/12* (2013.01); *F01D 25/36* (2013.01); *F02C 7/36* (2013.01); *F02K 3/06* (2013.01); *H02K 5/20* (2013.01); *H02K 7/14* (2013.01); *H02K 9/06* (2013.01); *H02P 29/40* (2016.02); *B64D 2027/026* (2013.01); *F05D 2220/323* (2013.01); *F05D 2260/20* (2013.01); *F05D 2260/4031* (2013.01); *F05D 2270/02* (2013.01)

(58) Field of Classification Search
CPC ........ F02C 7/277; F02C 7/32; F05D 2220/40; F05D 2260/85; F02B 39/10
See application file for complete search history.

(56) References Cited

U.S. PATENT DOCUMENTS

| | | | |
|---|---|---|---|
| 2016/0169104 A1* | 6/2016 | Rowe | F02C 9/18 |
| | | | 251/129.12 |
| 2017/0175565 A1 | 6/2017 | Sennoun | |
| 2017/0190441 A1* | 7/2017 | Mackin | F01D 25/36 |
| 2018/0058243 A1* | 3/2018 | Auker | F02C 7/32 |
| 2019/0003488 A1* | 1/2019 | Stefanovic | H02K 5/20 |

FOREIGN PATENT DOCUMENTS

| | | |
|---|---|---|
| EP | 3190052 | 7/2017 |
| EP | 3290651 | 3/2018 |

OTHER PUBLICATIONS

European Patent Office, European Search Report dated Jul. 7, 2019 in Application No. 19161009.6.

* cited by examiner

*Primary Examiner* — Shawki S Ismail
*Assistant Examiner* — Zoheb S Imtiaz
(74) *Attorney, Agent, or Firm* — Snell & Wilmer L.L.P.

(57) ABSTRACT

An electric propulsion system for a gas turbine engine may comprise an electric motor disposed within a nacelle of the gas turbine engine, wherein the electric motor is configured to receive a bypass air from a fan bypass duct for cooling the electric motor and the electric motor is configured to drive a low speed shaft of the gas turbine engine.

20 Claims, 7 Drawing Sheets

ELECTRIC PROPULSION MOTOR COOLING SYSTEM AND METHOD

FIELD

The present disclosure relates to gas turbine engines, and specifically to electric propulsion systems and methods for gas turbine engines.

BACKGROUND

Typically, gas turbines are operated with a significant portion of the engine's mission being spent at power levels below maximum power, where their inherent power density and emissions advantages are not substantially valued. For example, a large portion of an aircraft flight may be during cruise (power level below maximum power), while a smaller portion of the aircraft flight is during takeoff (power level at or near maximum power). This is due to the steep falloff in gas turbine thermal efficiency as power is reduced, resulting in low-power fuel consumption.

SUMMARY

An electric propulsion system for a gas turbine engine is disclosed, comprising an electric motor disposed within a nacelle of the gas turbine engine, wherein the electric motor is configured to receive a bypass air from a fan bypass duct for cooling the electric motor and the electric motor is configured to drive a low speed shaft of the gas turbine engine.

In various embodiments, the electric motor is configured to be disposed radially outward from the bypass fan duct.

In various embodiments, the electric motor is in operable communication with the low speed shaft.

In various embodiments, the electric motor comprises a stator winding, wherein the bypass air cools the stator winding.

In various embodiments, the electric motor comprises a rotor driven by the stator winding.

In various embodiments, the electric propulsion system further comprises a drive shaft coupled to the rotor, wherein the drive shaft is configured to extend through the fan bypass duct.

In various embodiments, the electric motor is in operable communication with the low speed shaft via the drive shaft, wherein the drive shaft is oriented substantially perpendicular to the low speed shaft.

In various embodiments, the electric propulsion system further comprises a motor cooling duct disposed in the nacelle and configured to receive the bypass air from the electric motor and direct the bypass air away from the electric motor.

In various embodiments, the motor cooling duct directs the bypass air back into the fan bypass duct.

A gas turbine engine is disclosed, comprising a nacelle at least partially defining a fan bypass duct, a low speed shaft configured to rotate about a longitudinal axis of the gas turbine engine, and an electric propulsion system, comprising, an electric motor disposed within the nacelle, wherein the electric motor is configured to receive a bypass air from the fan bypass duct for cooling the electric motor and the electric motor is configured to drive the low speed shaft.

In various embodiments, the gas turbine engine further comprises a drive shaft extending from the electric motor and through the fan bypass duct.

In various embodiments, the drive shaft is operably coupled to the low speed shaft.

In various embodiments, the gas turbine engine further comprises a motor cooling duct disposed within the nacelle and configured to direct the fan bypass air from the electric motor.

In various embodiments, the gas turbine engine further comprises an electric motor controller in electronic communication with the electric motor.

In various embodiments, the electric motor controller is configured to send a power signal to the electric motor during at least one of a takeoff event or a taxi event, wherein the electric motor drives the low speed shaft in response to the power signal.

In various embodiments, the gas turbine engine further comprises a motor cooling door moveable between an open position and a closed position, wherein the motor cooling door prevents air from flowing through the motor cooling duct in the closed position.

In various embodiments, the gas turbine engine further comprises a bevel gear coupled to the low speed shaft, whereby the drive shaft rotates the low speed shaft.

A method of operating an electric propulsion system for a gas turbine engine is disclosed, comprising sending, by an electric motor controller, a power signal to an electric motor, rotating, by the electric motor, a drive shaft in response to receiving the power signal, and driving, by the electric motor, a low speed shaft via the drive shaft in response to the rotating.

In various embodiments, the method further comprises sending, by the electric motor controller, a second power signal to a motor cooling door, wherein the motor cooling door opens in response to the second power signal.

In various embodiments, the method further comprises receiving, by the electric motor, fan bypass duct air for cooling the electric motor in response to the motor cooling door opening.

The foregoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration and their best mode. While these exemplary embodiments are described in sufficient detail to enable those skilled in the art to practice the inventions, it should be understood that other embodiments may be realized and that logical, chemical and mechanical changes may be made without departing from the spirit and scope of the inventions. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

As used herein, "aft" refers to the direction associated with the tail (e.g., the back end) of an aircraft, or generally, to the direction of exhaust of the gas turbine engine. As used herein, "forward" refers to the direction associated with the nose (e.g., the front end) of an aircraft, or generally, to the direction of flight or motion.

Typically, gas turbines are operated with a significant portion of the engine's mission being spent at power levels below maximum power, where their inherent power density and emissions advantages are not substantially valued. For example, a large portion of an aircraft flight may be during cruise (power level below maximum power), while a smaller portion of the aircraft flight is during takeoff (power level at or near maximum power). This is due to the steep falloff in gas turbine thermal efficiency as power is reduced, resulting in low-power fuel consumption.

An electric propulsion system, as described herein, may power the engine during, for example, takeoff and taxiing. In this regard, the gas turbine engine may be designed for efficiency at cruise conditions, since the engine will not have to also be designed for providing power during takeoff. The electric propulsion system, as described herein, may utilize bypass flow-path cooling air for cooling one or more electric motors. In this regard, the electric propulsion system allows for direct air cooling of the electric motor.

Figure 1:
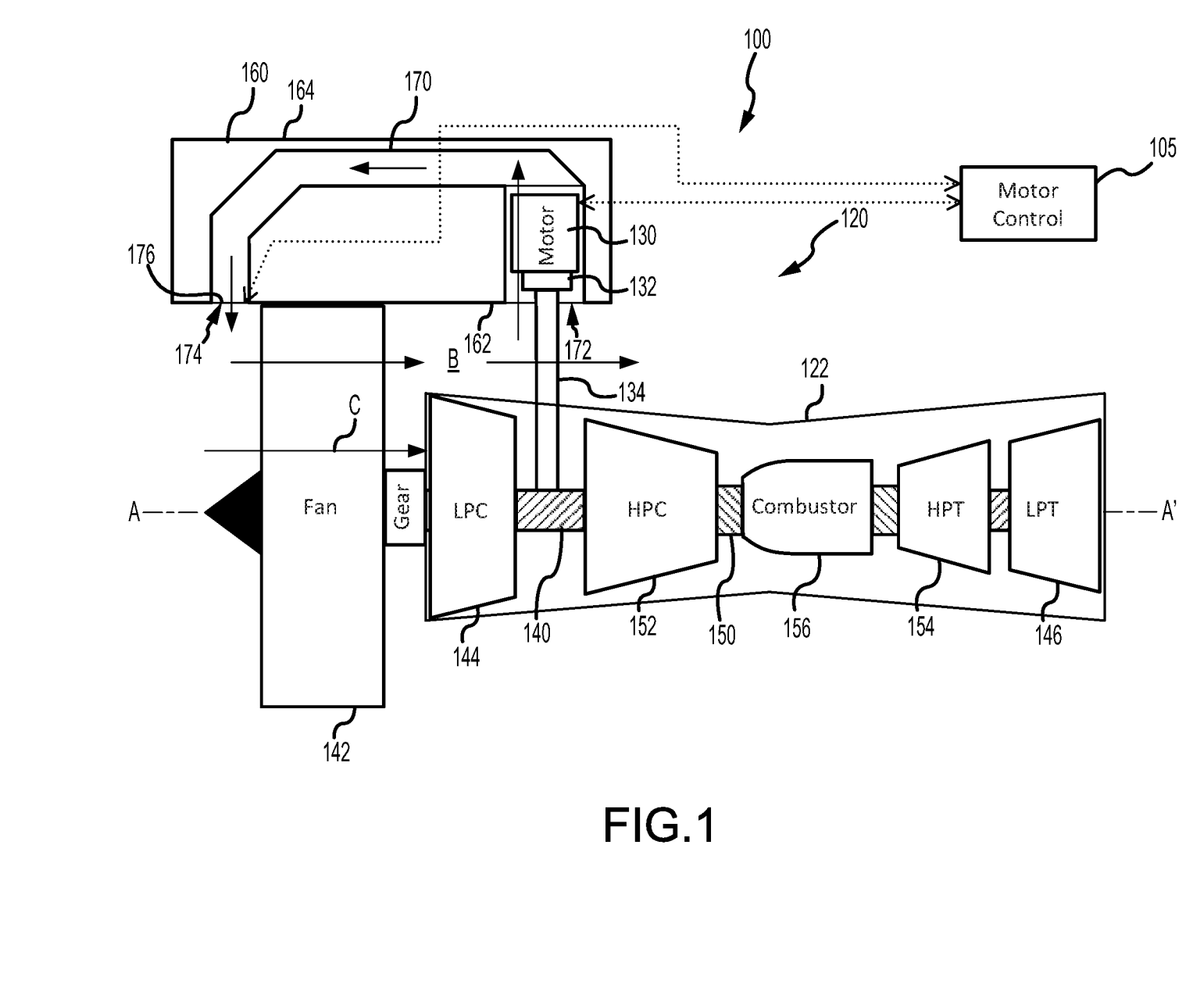
FIG. 1 is a schematic view of an electric propulsion system for a gas turbine engine, in accordance with various embodiments.

With reference to FIG. 1, a schematic view of an electric propulsion system for a gas turbine engine is illustrated, in accordance with various embodiments. A gas turbine engine 120 may include a first shaft 140 that interconnects a fan 142, a low pressure (or first) compressor section 144 and a low pressure (or first) turbine section 146. Gas turbine engine 120 may comprise a second shaft 150 that interconnects a high pressure (or second) compressor section 152 and high pressure (or second) turbine section 154. A combustor 156 may be located between high pressure compressor 152 and high pressure turbine 154. First shaft 140 and second shaft 150 may be concentric and rotate about the engine central longitudinal axis A-A', which is collinear with their longitudinal axes.

In operation, fan 142 can drive air along a bypass flow-path B (also referred to herein as a fan bypass duct) while compressors 144, 152 can drive air along a core flow-path C for compression and communication into combustor section 126 then expansion through turbine sections 154, 146.

In various embodiments, a nacelle 160 may surround core engine 122. Nacelle 160 may at least partially define bypass flow-path B disposed radially between core engine 122 and nacelle 160, only a part of which is shown for clarity. Stated differently, an inner surface 162 of nacelle 160 may at least partially define bypass flow-path B.

An electric propulsion system 100 may include an electric motor 130. Electric motor 130 may be operably coupled to first shaft 140. Electric motor 130 may drive first shaft 140. Electric motor 130 may be configured to drive first shaft 140 during pre-determined periods of an aircraft flight, such as during a takeoff event of an aircraft and/or a taxi event (i.e., movement of an aircraft on the ground under its own power), for example. A motor controller 105 may be in electronic communication with electric motor 130. Motor controller 105 may control electric motor 130. Motor controller 105 may control the speed of electric motor 130. Motor controller 105 may be configured to power electric motor 130. Motor controller 105 may be located onboard an aircraft. Electric motor 130 may be powered by an onboard auxiliary power unit (APU) and/or a battery.

In various embodiments, electric motor 130 may be in mechanical communication with first shaft 140 via a shaft (also referred to herein as a drive shaft) 134. Drive shaft 134 may extend through bypass flow-path B. A gear 132 may be coupled between drive shaft 134 and electric motor 130. In various embodiments, drive shaft 134 may be a splined shaft for mechanically interlocking drive shaft 134 to gear 132. However, drive shaft 134 may be coupled to electric motor 130 via any suitable means as known by a person having ordinary skill in the art.

A duct (also referred to herein as a motor cooling duct) 170 may be disposed within nacelle 160. Duct 170 may be disposed between inner surface 162 and outer surface 164 of nacelle 160. Duct 170 may receive cooling air from bypass flow-path B via inlet 172 disposed in inner surface 162. The cooling air may flow across electric motor 130, whereby heat from electric motor 130 may be convectively transferred to the cooling air. The cooling air may be routed, by duct 170 away from electric motor 130. In various embodiments, duct 170 may comprise an outlet 174 disposed in inner surface 162 whereby the cooling air may be dumped back into the bypass flow-path B and/or core flow-path C. In this manner, electric motor 130 may be cooled by bypass air from bypass flow-path B. Pressure within bypass flow-path B may tend to be greater than the inlet air pressure forward of fan 142. Thus, during operation, a pressure gradient may exist between inlet 172 and outlet 174, driving bypass air through duct 170.

In various embodiments, it may be desirable to close duct 170 to prevent air from flowing through duct 170, for example, when electric motor 130 is not in operation. Thus, a door 176 may be provided at outlet 174. Door 176 may comprise an electronically actuated door controlled by motor controller 105. Door 176 may be moveably between a closed position and an open position. For example, motor controller 105 may be configured to open door 176 when electric motor 130 is powered on and close door 176 when electric motor 130 is powered off. In this regard, door 176 may be in electronic communication with motor controller 105. Motor controller 105 may be configured to send a power signal (e.g., a current signal and/or a voltage signal) to door 176.

Figure 2A:
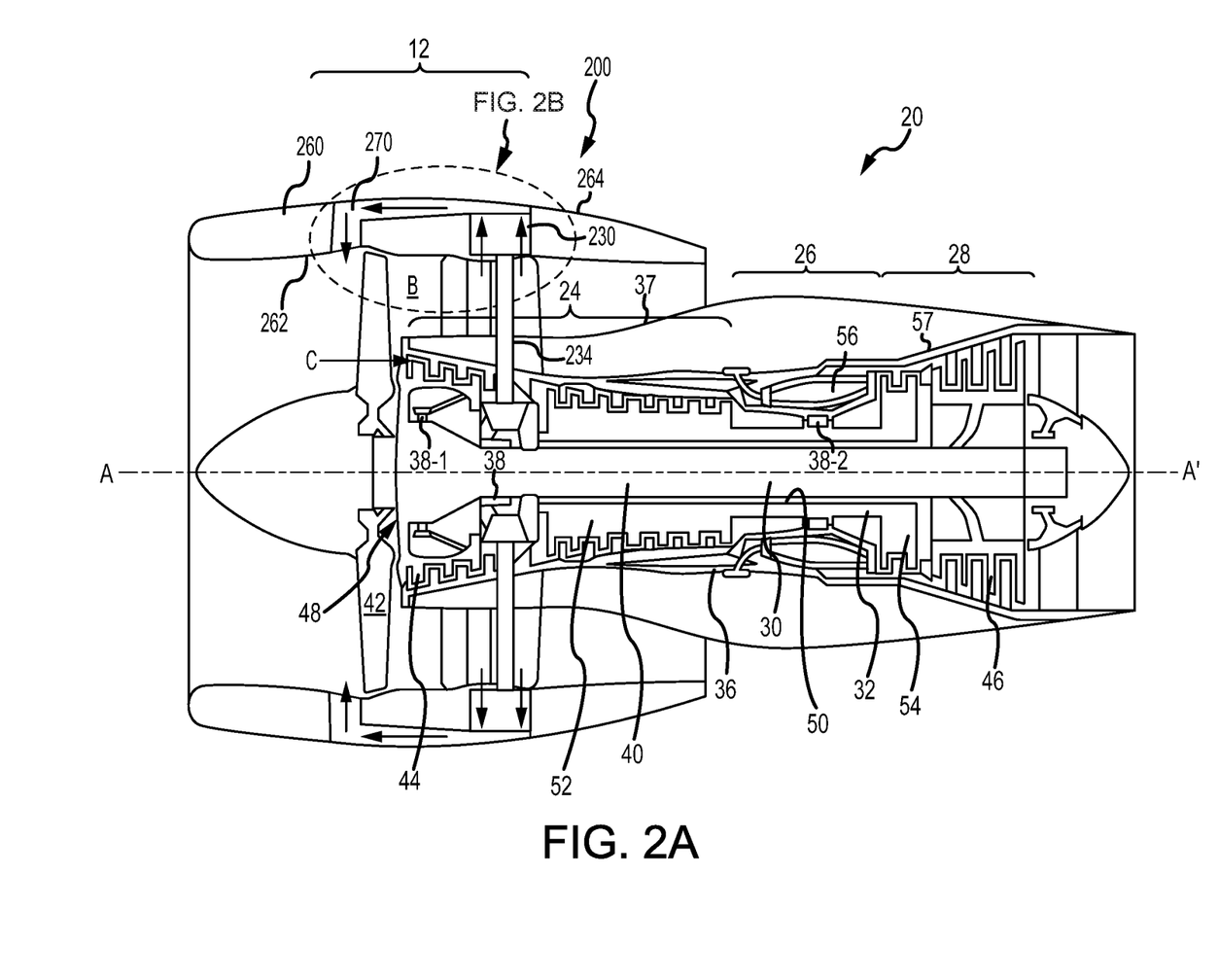
FIG. 2A is a schematic view of an exemplary gas turbine engine having an electric propulsion system, in accordance with various embodiments.

In various embodiments and with reference to FIG. 2A, a gas turbine engine 20 is provided. Gas turbine engine 20 may be a two-spool turbofan that generally incorporates a fan section 22, a compressor section 24, a combustor section 26 and a turbine section 28. Alternative engines may include, for example, an augmentor section among other systems or features. In operation, fan section 22 can drive air along a bypass flow-path B while compressor section 24 can drive air along a core flow-path C for compression and communication into combustor section 26 then expansion through turbine section 28.

Gas turbine engine 20 may generally comprise a low speed spool 30 and a high speed spool 32 mounted for rotation about an engine central longitudinal axis A-A' relative to an engine static structure 36 via several bearing systems 38, 38-1, and 38-2. It should be understood that various bearing systems 38 at various locations may alternatively or additionally be provided, including for example, bearing system 38, bearing system 38-1, and bearing system 38-2.

Low speed spool 30 may generally comprise an inner shaft 40 that interconnects a fan 42, a low pressure (or first) compressor section 44 and a low pressure (or first) turbine section 46. Gas turbine engine 20 may comprise a geared architecture 48 that can drive fan 42 at a lower speed than low speed spool 30. Geared architecture 48 may comprise a gear assembly enclosed within a gear housing. However, it is contemplated that low speed spool 30 may be operatively coupled to fan 42 such that low speed spool 30 and fan 42 rotate at the same rate. The gear assembly may couple inner shaft to a rotating fan structure. High speed spool 32 may comprise an outer shaft 50 that interconnects a high pressure (or second) compressor section 52 and high pressure (or second) turbine section 54. A combustor 56 may be located between high pressure compressor 52 and high pressure turbine 54. A mid-turbine frame 57 of engine static structure 36 may be located generally between high pressure turbine 54 and low pressure turbine 46. Mid-turbine frame 57 may support one or more bearing systems 38 in turbine section 28. Inner shaft 40 and outer shaft 50 may be concentric and rotate via bearing systems 38 about the engine central longitudinal axis A-A', which is collinear with their longitudinal axes. As used herein, a "high pressure" compressor or turbine experiences a higher pressure than a corresponding "low pressure" compressor or turbine.

The core airflow C may be compressed by low pressure compressor section 44 then high pressure compressor 52, mixed and burned with fuel in combustor 56, then expanded over high pressure turbine 54 and low pressure turbine 46. Turbines 46, 54 rotationally drive the respective low speed spool 30 and high speed spool 32 in response to the expansion.

In various embodiments, a nacelle 260 may surround gas turbine engine 20. Nacelle 160 may at least partially define bypass flow-path B disposed radially between inner fixed structure (IFS) 37 and nacelle 260. Stated differently, an inner surface 262 of nacelle 260 may at least partially define bypass flow-path B.

In various embodiments, gas turbine engine 20 may include an electric propulsion system 200. Electric propulsion system 100 of FIG. 1 may be similar to electric propulsion system 200, in accordance with various embodiments. Electric propulsion system 200 may include an electric motor 230 disposed in nacelle 260. Electric propulsion system 200 may include drive shaft 234 operatively coupled between electric motor 230 and inner shaft 40. Electric propulsion system 200 may include a duct (also referred to herein as a motor cooling duct) 270. Duct 270 may direct cooling air away from electric motor 230.

Figure 2B:
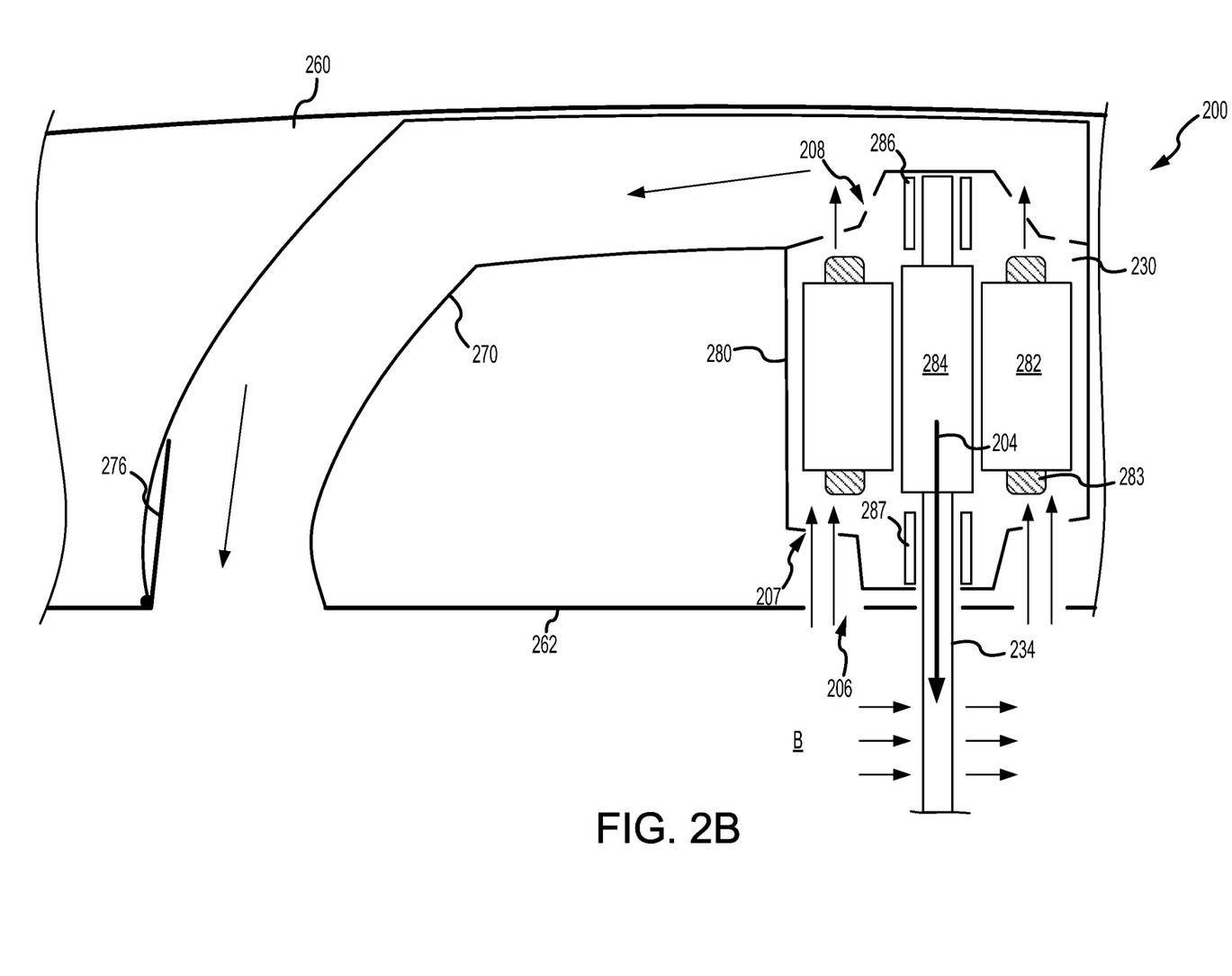
FIG. 2B is a schematic view of a portion of the electric propulsion system of FIG. 2A, in accordance with various embodiments.

With reference to FIG. 2B, electric motor 230 may comprise a housing 280. In various embodiments, housing 280 may be made from a metal, such as aluminum or steel, among others. Housing 280 may be coupled to nacelle 260. Electric motor 230 may comprise one or more stators 282 and a rotor 284 disposed within housing 280. Stator 282 may include a winding (also referred to herein as a stator winding) 283 that receives an electrical current—e.g., from motor controller 105 of FIG. 1—for driving rotor 284. In this regard, a torque 204 may be transferred from rotor 284 to drive shaft 234. Rotor 284 may be supported by a first bearing 286 and a second bearing 287. First bearing 286 and a second bearing 287 may be coupled to housing 280. Drive shaft 234 may extend from rotor 284. Drive shaft 234 may rotate with rotor 284 with respect to housing 280.

Duct 270 may include an electronically actuated door 276. In various embodiments, door 276 may be located at inner surface 262 of nacelle 260. Bypass air from bypass flow-path B may enter into housing 280 in response to door 276 opening. In this regard, one or more inlet apertures 206 may be disposed in inner surface 262, whereby cooling air may enter housing 280. Housing 280 may define one or more inlet apertures (also referred to herein as a motor housing inlet aperture) 207 whereby cooling air may enter housing 280. The cooling air may flow across stator 282 whereby heat may be convectively transferred to the cooling air. This heat may be taken from stator 282 and out housing 280 via the cooling air through one or more apertures (also referred to herein as a motor housing outlet aperture) 208. Of course, heat from any of the housing 280, the stator 282, and/or the rotor 284 may be transferred to the cooling air and removed from housing 280 via duct 270.

Drive shaft 234 may extend through bypass flow-path B. Bypass air in bypass flow-path B may flow across drive shaft 234, providing additional cooling to electric motor 230. Stated differently, heat may conductively transfer from rotor 284 into drive shaft 234 and may be transferred to bypass air in bypass flow-path B.

Figure 2C:
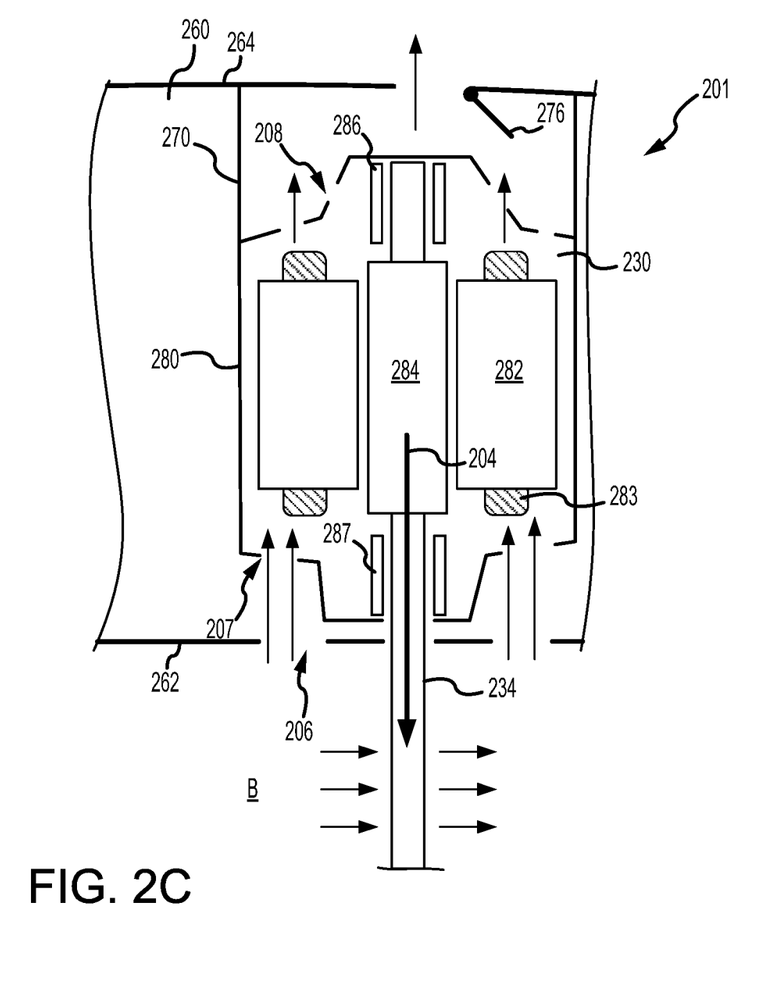
FIG. 2C is a schematic view of an electric propulsion system having an outlet defined by an outer surface of a nacelle whereby cooling air is directed out of the nacelle, in accordance with various embodiments.

With respect to FIG. 2C, elements with like element numbering, as depicted in FIG. 2B, are intended to be the same and will not necessarily be repeated for the sake of clarity.

Although illustrated in FIG. 2A as routing cooling air back into nacelle 260 forward of fan 42, it is contemplated that duct 270 may route cooling air outside nacelle 260, for example via an outlet defined by outer surface 264, as illustrated by electric propulsion system 201 of FIG. 2C. In various embodiments, outer surface 264 may be an aerodynamic surface.

Figure 3:
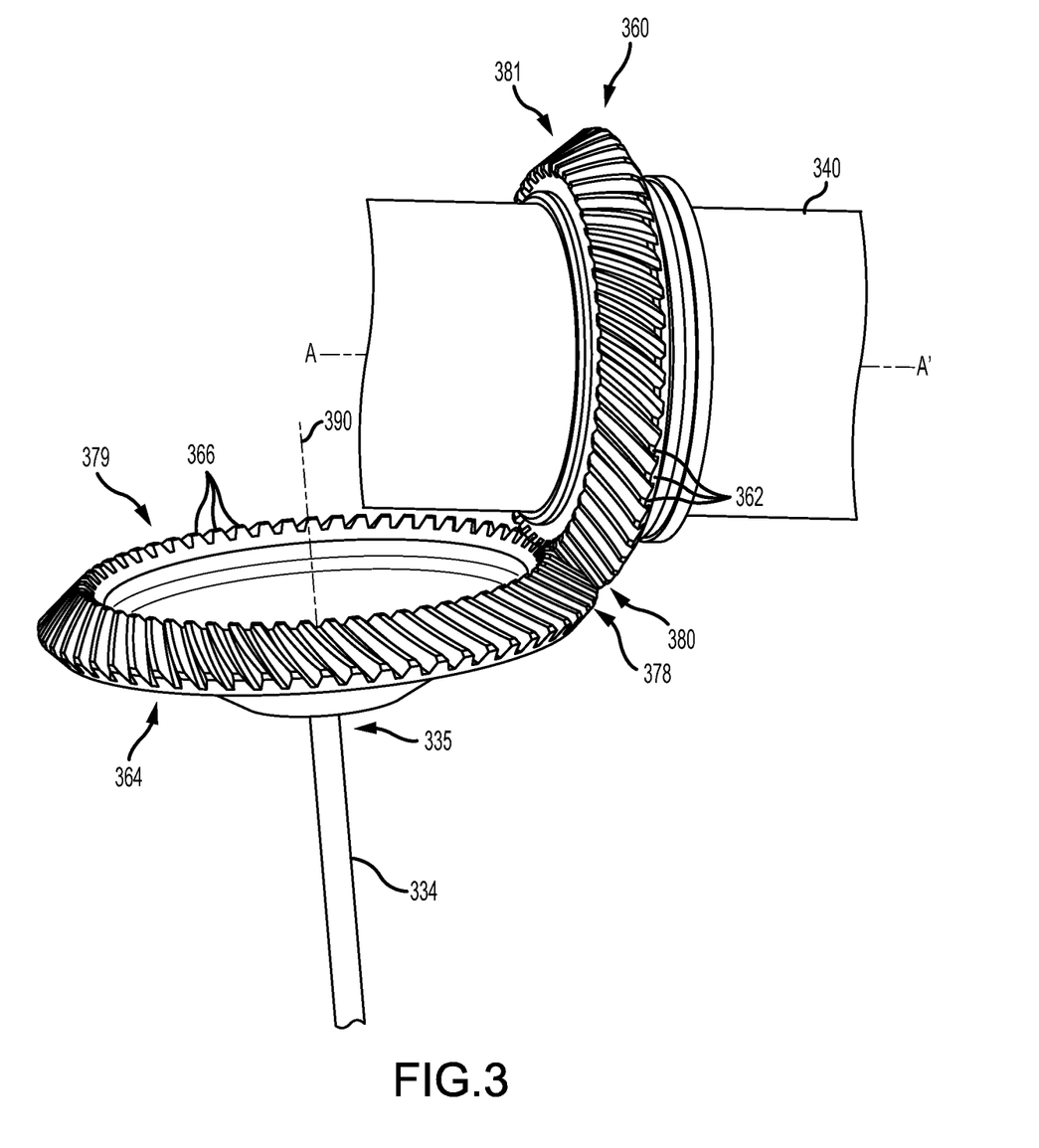
FIG. 3 is an isometric view of a low speed shaft operably coupled to a drive shaft via bevel gears, in accordance with various embodiments.

With reference to FIG. 3, a low speed shaft 340 and a drive shaft 334 are illustrated, in accordance with various embodiments. With momentary reference to FIG. 2A, inner shaft 40 may be similar to low speed shaft 340, in accordance with various embodiments. Drive shaft 234 may be similar to drive shaft 334, in accordance with various embodiments.

Drive shaft 334 may include a gear (also referred to herein as a first gear) 364. Gear 364 may comprise a bevel gear. In various embodiments, gear 364 may be coupled to an end 335 of drive shaft 334. Gear 364 may include a plurality of first gear teeth 366. These first gear teeth 366 may be arranged in a circumferential array, which may extend circumferentially around centerline 390 of drive shaft 334. The first gear teeth 366 may be configured to provide gear 364 with an annular, conically shaped pitch surface.

Low speed shaft 340 may include a gear (also referred to herein as a second gear) 360. Gear 360 may comprise a bevel gear. Gear 360 may be coupled to the outer diameter surface of low speed shaft 340. Gear 360 may include a plurality of second gear teeth 362. These second gear teeth 362 may be arranged in a circumferential array, which may extend circumferentially around engine central longitudinal axis A-A'. The second gear teeth 362 may be configured to provide gear 360 with an annular, conically shaped pitch surface.

The first gear 364 may be meshed (e.g., mated and engaged) with the second gear 360. In particular, a first subset 378 (e.g., meshed subarray) of the first gear teeth 366 may be mesh with a first subset 380 (e.g., meshed subarray) of the second gear teeth 362, where each of these subsets 378, 380 includes one or more of the respective gear teeth 366, 362. With the foregoing meshed configuration, a second subset 379 (e.g., unmeshed subarray) of the first gear teeth 366 (e.g., the remaining first gear teeth) are unmeshed and disengaged from a second subset 381 (e.g., unmeshed subarray) of the second gear teeth 362 (e.g., the remaining second gear teeth), where each of these subsets 379, 381 includes a plurality—e.g., here the majority—of the respective gear teeth 366, 362. It should be noted that the specific gear teeth in each subset will change as the respective gear rotates about its respective rotational axis. The present disclosure, of course, is not limited to the foregoing exemplary second gear types or configurations.

Figure 4:
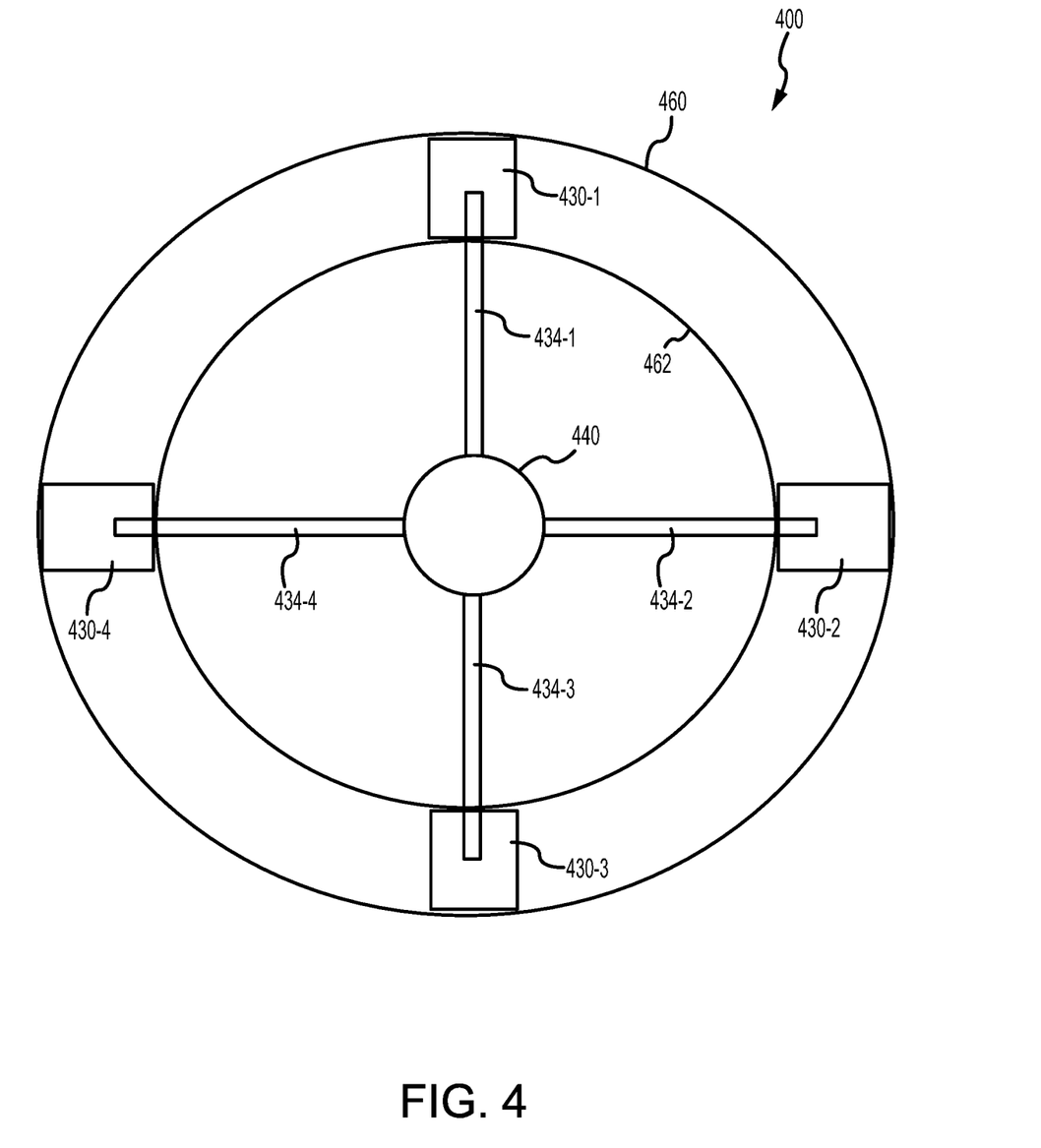
FIG. 4 is a schematic view, looking axially, of a plurality of electric motors operably coupled to a low speed shaft of a gas turbine engine, in accordance with various embodiments.

With reference to FIG. 4, a schematic view of an electric propulsion system 400 is illustrated, in accordance with various embodiments. Electric propulsion system 100 of FIG. 1 may be similar to electric propulsion system 400. Electric propulsion system 400 may include a plurality of electric motors disposed around low speed shaft 440. For example, electric propulsion system 400 may include a first electric motor 430-1, a second electric motor 430-2, a third electric motor 430-3, and a fourth electric motor 430-4. Although illustrated as having four electric motors, it is contemplated that electric propulsion system 400 may have any number of electric motors, such as one, two, three, five, or six electric motors for example.

Electric propulsion system 400 may include a first drive shaft 434-1 coupled between first electric motor 430-1 and low speed shaft 440. Electric propulsion system 400 may include a second drive shaft 434-2 coupled between second electric motor 430-2 and low speed shaft 440. Electric propulsion system 400 may include a third drive shaft 434-3 coupled between third electric motor 430-3 and low speed shaft 440. Electric propulsion system 400 may include a fourth drive shaft 434-4 coupled between fourth electric motor 430-4 and low speed shaft 440. Each drive shaft (i.e., first drive shaft 434-1, second drive shaft 434-2, third drive shaft 434-3, and/or fourth drive shaft 434-4) may be coupled to low speed shaft 440 via gears, such as those described with reference to FIG. 3. In this regard, low speed shaft 440 may comprise a single bevel gear operably coupled to a plurality of bevel gears associated with each of these drive shafts.

Figure 5:
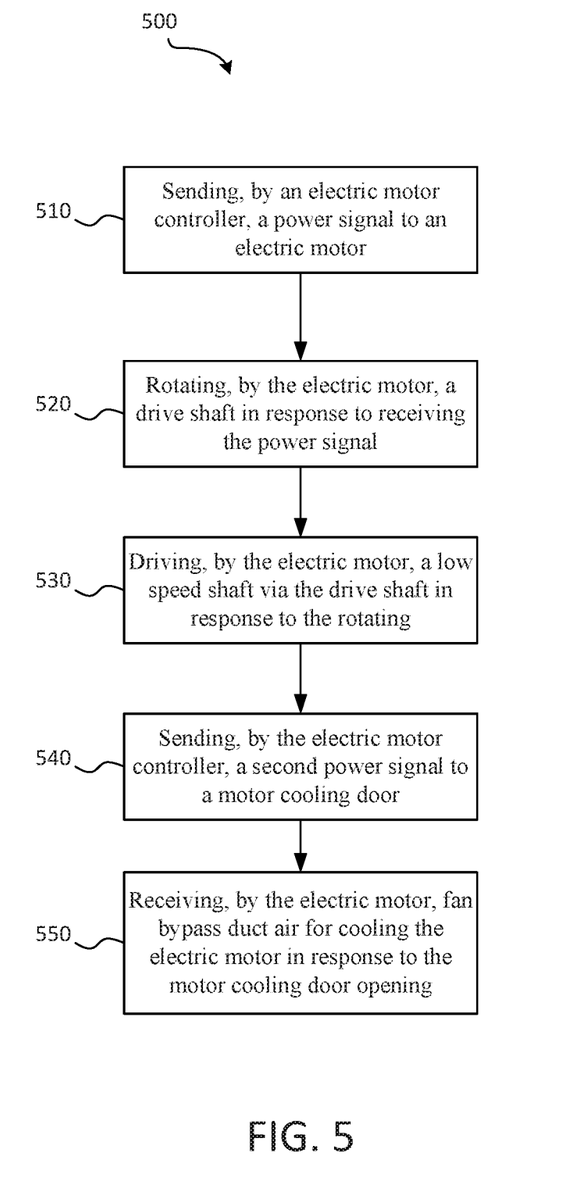
FIG. 5 is a flow chart illustrating a method of operating an electric propulsion system for a gas turbine engine, in accordance with various embodiments.

With reference to FIG. 5, a method 500 of operating an electric propulsion system for a gas turbine engine is provided, in accordance with various embodiments. Method 500 includes sending, by an electric motor controller, a power signal to an electric motor (step 510). Method 500 includes rotating, by the electric motor, a drive shaft in response to receiving the power signal (step 520). Method 500 includes driving, by the electric motor, a low speed shaft via the drive shaft in response to the rotating (step 530). Method 500 includes sending, by the electric motor controller, a second power signal to a motor cooling door (step 540). Method 500 includes receiving, by the electric motor, fan bypass duct air for cooling the electric motor in response to the motor cooling door opening (step 550).

With combined reference to FIG. 1 and FIG. 5, step 510 may include sending, by electric motor controller 105, a power signal to electric motor 130. This power signal may be a current signal. This power signal may be a voltage signal. This power signal may be a three-phase signal. Step 520 may include rotating, by electric motor 130, drive shaft 134 in response to receiving the power signal. Step 530 may include driving, by electric motor 130, first shaft 140 via drive shaft 134 in response to drive shaft 134 rotating. In this manner, electric motor 130 may drive fan 142. Step 540 may include sending, by electric motor controller 105, a second power signal to door 176. Door 176 may open in response to the second power signal. Step 550 may include receiving, by electric motor 130, fan bypass duct air from bypass flow-path B for cooling electric motor 130 in response to door 176 opening.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is intended to invoke 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

The invention claimed is:

1. An electric propulsion system for a gas turbine engine, comprising:
    an electric motor disposed within a nacelle of the gas turbine engine, an inner surface of the nacelle at least partially defines a fan bypass duct, and the electric motor is disposed radially outward from the fan bypass duct;
    wherein the electric motor is configured to receive a bypass air from the fan bypass duct for cooling the electric motor and the electric motor is configured to drive a low speed shaft of the gas turbine engine.

2. The electric propulsion system of claim 1, wherein the electric motor is in operable communication with the low speed shaft.

3. The electric propulsion system of claim 2, wherein the electric motor comprises a stator winding, wherein the bypass air cools the stator winding.

4. The electric propulsion system of claim 3, wherein the electric motor comprises a rotor driven by the stator winding.

5. The electric propulsion system of claim 4, further comprising a drive shaft coupled to the rotor, wherein the drive shaft is configured to extend through the fan bypass duct.

6. The electric propulsion system of claim 5, wherein the electric motor is in operable communication with the low speed shaft via the drive shaft, wherein the drive shaft is oriented substantially perpendicular to the low speed shaft.

7. The electric propulsion system of claim 6, further comprising a motor cooling duct disposed in the nacelle and configured to receive the bypass air from the electric motor and direct the bypass air away from the electric motor.

8. The electric propulsion system of claim 7, wherein the motor cooling duct directs the bypass air back into the fan bypass duct.

9. A gas turbine engine, comprising:
    a nacelle comprising an inner surface at least partially defining a fan bypass duct;
    a low speed shaft configured to rotate about a longitudinal axis of the gas turbine engine; and
    an electric propulsion system, comprising:
        an electric motor disposed within the nacelle, the electric motor is disposed radially outward from the fan bypass duct;
        wherein the electric motor is configured to receive a bypass air from the fan bypass duct for cooling the electric motor and the electric motor is configured to drive the low speed shaft.

10. The gas turbine engine of claim 9, further comprising a drive shaft extending from the electric motor and through the fan bypass duct.

11. The gas turbine engine of claim 10, wherein the drive shaft is operably coupled to the low speed shaft.

12. The gas turbine engine of claim 9, further comprising a motor cooling duct disposed within the nacelle and configured to direct the fan bypass air from the electric motor.

13. The gas turbine engine of claim 9, further comprising an electric motor controller in electronic communication with the electric motor.

14. The gas turbine engine of claim 13, wherein the electric motor controller is configured to send a power signal to the electric motor during at least one of a takeoff event or a taxi event, wherein the electric motor drives the low speed shaft in response to the power signal.

15. The gas turbine engine of claim 12, further comprising a motor cooling door moveable between an open position and a closed position, wherein the motor cooling door prevents air from flowing through the motor cooling duct in the closed position.

16. The gas turbine engine of claim 10, further comprising a bevel gear coupled to the low speed shaft, whereby the drive shaft rotates the low speed shaft.

17. A method of operating an electric propulsion system for a gas turbine engine, comprising:
    sending, by an electric motor controller, a power signal to an electric motor, wherein the electric motor is disposed in a nacelle for the gas turbine engine, an inner surface of the nacelle partially defines a fan bypass duct, and the electric motor is disposed radially outward from the inner surface;
    rotating, by the electric motor, a drive shaft in response to receiving the power signal, wherein the drive shaft extends through the fan bypass duct;
    driving, by the electric motor, a low speed shaft via the drive shaft in response to the rotating;
    sending, by the electric motor controller, a second power signal to a motor cooling door, wherein the motor cooling door is configured to open in response to the second power signal; and
    receiving, by the electric motor, fan bypass duct air for cooling the electric motor in response to the motor cooling door opening.

18. The electric propulsion system of claim 1, wherein the motor cooling duct comprises an inlet disposed in the inner surface and an outlet.

19. The electric propulsion system of claim 18, wherein the outlet is disposed in the inner surface forward from a fan configured to drive the bypass air along the fan bypass duct.

20. The electric propulsion system of claim 18, wherein the outlet is disposed in an outer surface of the nacelle.

* * * * *